Patented Nov. 21, 1939

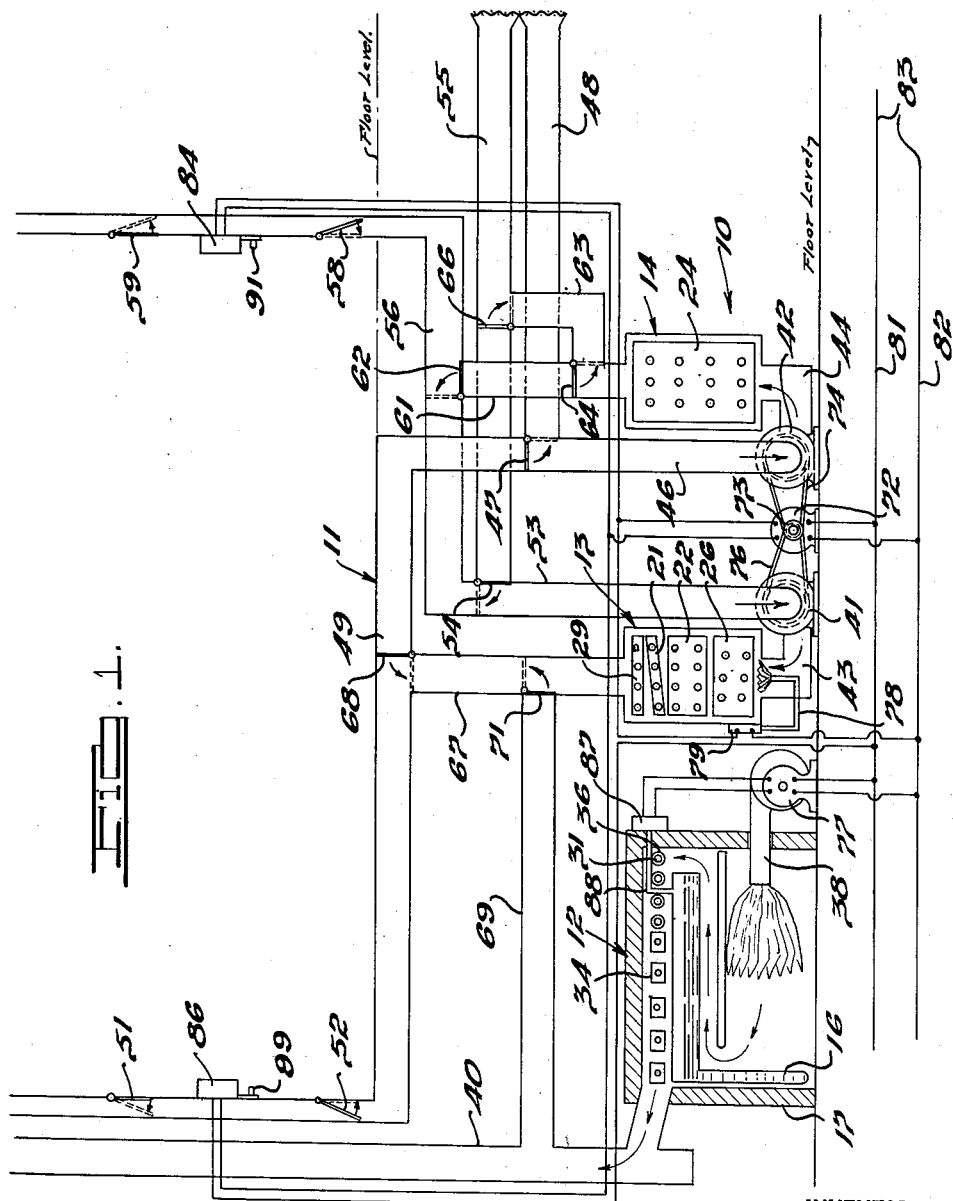

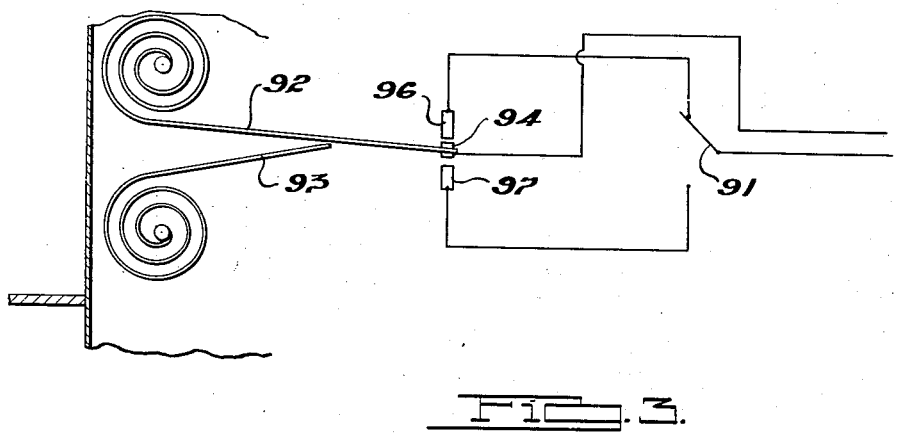
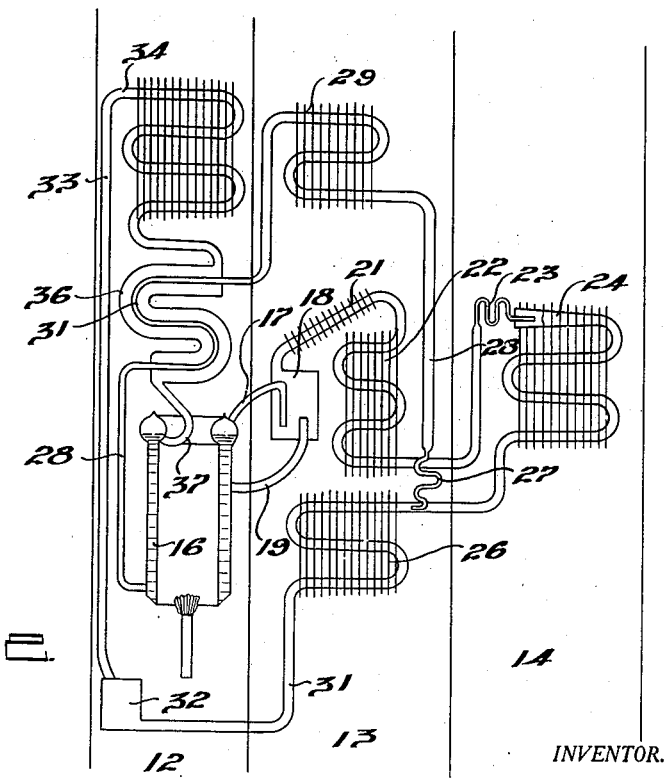

2,180,634

UNITED STATES PATENT OFFICE 2,180,634

AIR CONDITIONING SYSTEM

Earl F. Hubacker, Highland Park, Mich., assignor to Borg-Warner Corporation, a corporation of Illinois Application December 23, 1935, Serial No. 55,725

14 Claims. (Cl. 62—5)

This invention relates to a system for conditioning air and is particularly applicable both for heating and cooling air.

An object of the invention is to provide a single heat exchanging system by the employment of which a room can be cooled to a comfortable temperature in the summer time and can be heated practically to the same temperature in the winter time, the system being operable in substantially the same manner and with the same source of energy for accomplishing either purpose.

Another object of the invention is to provide a system for exchanging heat which can be operated as a refrigerating system in the summer and as a heating system in the winter, the system being operable in the summer time to absorb heat from the inside of a room and to transfer such heat to the exterior thereof, and in the winter time to absorb heat from the exterior of such room and thereafter transfer such heat to the interior of the room, all being for the purpose of maintaining throughout the year a substantially uniform room temperature.

Another object of the invention is to provide a unitary system operated by heat for cooling or heating the same room or building.

Another object of the invention is to provide a system of controls whereby a heat exchange system can be operated for absorbing heat from the atmosphere and dissipating it within an enclosure or absorbing heat from the enclosure and dissipating it within the atmosphere.

Another object of the invention is to provide a control system capable of operating a heat exchanging system to maintain a relatively constant room temperature in winter and a variable room temperature in summer which is a relatively constant number of degrees below atmospheric temperature.

The embodiment of the invention herein disclosed comprises what has heretofore been known as an absorption refrigerating system which is adapted to be placed in the basement of a house, for example, and by the use of which the house can be either heated or cooled. The generator of this absorption refrigerating system may comprise a furnace somewhat like that heretofore used in heating houses and may be operated in connection with an oil burner or other similar source of heat but one having a more limited capacity than heretofore would have been required for heating such a house. The furnace, however, does not deliver heat to the house directly, but instead of this, provides condensible fluid employed in both the heat absorbing and heat dissipating units of the so-called refrigerating system. A reversible system of ducts is provided for supplying air during the winter season from the inside of the building to a heat dissipating unit to absorb the heat supplied by the furnace and absorbed from the atmosphere in the heat absorbing unit and then during the summer season to supply air from the room to the heat absorbing unit and from whence such heat is transferred to the heat dissipating unit to be dissipated into the atmosphere. The system of controls provided causes the system to operate cyclically in such a way as to be suitable for operation as a heating system in winter and as a cooling system in summer.

For a better understanding of the invention, reference may now be had to the drawings accompanying and forming a part of this specification, in which:

Fig. 1 is a view diagrammatically illustrating a duct and heat exchanging system for heating in winter and cooling in summer;

Fig. 2 is a view diagrammatically illustrating the various units and conduit system employed in the heat exchanging system illustrated by Fig. 1; and Fig. 3 is a diagrammatic illustration of a control mechanism employed in the practice of the invention.

In the drawings, Fig. 1, there is illustrated diagrammatically a heat exchange system indicated generally by the numeral 10 and a duct system 11 by which air to be cooled or heated may be conducted in the vicinity of the system for the purpose of absorbing and dissipating heat. If this system were employed in heating and cooling a house, for example, it would be convenient to locate the heat exchanging system in the basement of the house somewhat as is diagrammatically illustrated in Fig. 1, and the duct system would extend upwardly therefrom to one or more rooms of the house.

The heat exchanging system comprises generally a heating unit 12, a heat dissipating unit 13, and a heat absorbing unit 14. The connection of these elements to provide an operative heat absorbing and dissipating system is illustrated generally and diagrammatically in Fig. 2 wherein the numeral 12 is applied to the passage containing the generator and other elements to be heated, the numeral 13 to the passage containing various elements of the system for dissipating heat, and the numeral 14 to the passage containing the element for the absorption of heat.

Referring still further to Fig. 2 for the description and operation of the various elements comprising the heat exchanging system illustrated by Fig. 1, the numeral 16 illustrates a generator, boiler or furnace in which is contained a separable mixture of ammonia and water or other suitable fluids having a large degree of affinity for one another, the ammonia being adapted to vaporize within the generator upon the application of heat thereto and to collect in the vapor space above the liquid in the upper region thereof. The ammonia vapor is delivered from the generator by a conduit 17 connected to the vapor space at one end and at the opposite end thereof to the lower region within a trap 18 located within the passage 13. Above the lower end of the conduit 17 the trap 18 also is connected by a conduit 19 to the space within the generator 16 below the liquid level therein. The ammonia vapor delivered to the trap by the conduit 17 will bubble through any liquid contained within the trap below the upper end of the conduit 19.

The upper region within the trap 18 is connected to a rectifier 21 through which the ammonia vapor passes in leaving the trap and in which will be condensed any small quantity of water vapor that may have been discharged by the generator with the ammonia vapor taken therefrom. This condensed water vapor will flow backwardly within the rectifier 21 to the interior of the trap 18 and from whence it will eventually be discharged into the generator 16 through the conduit 19. From the rectifier 21 relatively pure ammonia vapor will be discharged into condenser 22 wherein the latent heat contained within the vapor will be extracted therefrom to provide liquid ammonia which will collect in the lower regions thereof. The liquid ammonia from the condenser 22 is discharged through a metering device or capillary tube 23 into a liquid evaporator 24, wherein liquid ammonia evaporates and absorbs heat from air contained within the passage 14. The lower part of the evaporator 24 is connected to an absorber 26 located within the passage 13 and to which also is connected, by a metering device 27, a conduit 28 for supplying weak liquor or water from the lower part of the generator 16 to the absorber.

The conduit 28 has connected therein, between the metering device 27 and the generator 16, a heat exchanger 29 located within the passage 13 and a heat exchange conduit 31 located within the passage 13 beyond the generator 16. Within the absorber 26 the ammonia vapor delivered thereto from the evaporator 24 is absorbed by the water delivered by the metering device 27 and during such absorption gives off heat to the air within the passage 13 thereabout. From the absorber 26 the strong liquor or rich mixture of liquid ammonia and water flows through a conduit 31 to a pump 32 of any type suitable for employment in such systems. This pump increases the pressure of the liquid to generator pressure and forces the liquid through conduit 33 into a heat exchanging device 34 located in the passage 12 beyond the generator 16 and the heat exchange conduit 31. The lower portion of the heat exchanger 34 is connected to a heat exchange conduit 36 surrounding the heat exchange conduit 31 and the lower extremity of which is connected by a conduit 37 to the space within the generator 16 below the liquid level therein.

As is illustrated in Fig. 1, the generator 16 is made in the form of a furnace boiler of the type now generally being used to heat homes. The boiler is adapted to be surrounded by heat insulating material illustrated at 17, if this is desired, and to be heated by an oil burner 38 or other suitable source of heat. As is illustrated in Fig. 2, products of combustion from the oil burner 38 pass over the heat exchange surfaces of the boiler or generator 16, thence into the space beyond the boiler in which is located the heat exchange conduits 31 and 36 and the heat exchanger 34. Beyond the heat exchanger 34 the products of combustion may be discharged into the atmosphere surrounding a building in which this system is employed, through a stack indicated at 40.

Still referring to Fig. 1 and likewise as is illustrated in Fig. 2, the heat dissipating unit 13 is so located that air flowing upwardly therein will traverse first the absorber 26, the condenser 22, the rectifier 21, and the heat exchanger 29, and each of these elements will progressively heat the air from the bottom to the top thereof.

Again referring to Fig. 1, it will be apparent that air flowing within the heat absorbing unit 14 will be progressively cooled by the evaporator 24 contained therein.

In order to provide a circulation of air as heretofore described, within the heat dissipating unit 13 and the heat absorbing unit 14, there is provided a pair of blowers or fans 41 and 42 connected, respectively, to the bottoms of the aforesaid by air conduits 43 and 44. The intake side of the blower 42 is connected to an air conduit 46 having a connection controlled by a valve 47 with an air conduit 48 communicating with the outside of the building and with an air conduit 49 having upper and lower openings controlled by valves 51 and 52, respectively, adapted to communicate with the interior of a room. The intake side of the blower 41 is connected to an air conduit 53 having a valve 54 therein controlling its communication with an air conduit 55 likewise communicating with the atmosphere, and therebeyond the air conduit 53 also communicates with an air duct 56 which, like the air duct 49, has upper and lower openings controlled by valves 59 and 58, respectively, and through which the conduit may be connected alternately to upper and lower regions within a room.

The upper or outlet end of the heat absorbing unit 14 is also connected to the air duct 56 by an air duct 61 having a valve 62 adapted to control the flow of air through either the air duct 61 or the air duct 56. The air duct 61 also has a connection through an air duct 63 with the air duct 55, and valves 64 and 66, respectively, are so located as to control the flow of air through the air ducts 61 and 63 and through the air ducts 63 and 55. The upper or outlet end of the heat dissipating unit 13 is connected by an air duct 67 to the air duct 49, and the flow of air at the junction of the two is controlled by a valve 68 adapted to close either of said passages. The air duct 67 also is connected by an air duct 69 to stack 41, and the flow of air therein is controlled by a valve 71 adapted to close either the duct 69 or the duct 67.

The blowers 41 and 42 may be driven in any suitable manner as by a motor 72 having a pair of pulleys 73 adapted to operate driving belts 74 and 76.

The oil burner 38, which is adapted to be driven by any suitable motor 77, is supplied with any suitable mechanism (not shown) adapted to light the burner and supply oil thereto whenever the motor 77 is operated.

An atomizing device 78 is provided at the lower part of the heat dissipating unit 13 for the purpose of spraying water upon the various heat dissipating elements contained therein. The flow of water through the atomizing device is controlled by any suitable electrically operated control valve, such as that indicated by the numeral 79.

The motors 72 and 77 adapted to energize the system are supplied with electrical current by the conductors 81 and 82 of an electric power line 83. The motor 72 is connected in series across the line 83 with a thermostatically operated switch 84 adapted to be located in such position as to be responsive to the temperature in any room with which the system is to be employed, and also to be responsive to the temperature of the atmosphere thereabout. The motor 72 also is connected in parallel with a humidistat 86 also located in the room to be air conditioned and with an electrically actuated valve 79 controlling the water spray 78. The motor 77 for operating the oil burner 38 is connected in series across the line 83 with pressure actuated switch 87 having a connection 88 with the vapor space in the boiler 16. The pressure actuated switch 87 is so constructed and arranged as to start the motor 77 when the pressure in the boiler falls below a predetermined minimum and to stop the motor when the pressure reaches a predetermined maximum somewhat higher than the aforesaid minimum.

The humidistat 86 has a short-circuiting switch 89 associated therewith which is adapted to disconnect the humidistat and short the electrical connections thereto in one position thereof and to connect the humidistat in the line in another position. The thermostatically actuated switch 84 is constructed as is diagrammatically illustrated in Fig. 2 and has associated therewith a two-way switch 91 adapted to so connect the electrical contacts within the switch as to render the circuit therethrough closable either when the temperature rises above a predetermined temperature or falls below a predetermined temperature.

For example, as is illustrated in Fig. 3, the switch comprises a thermostatic element 92 having a coil thereof affected by variations in temperature, exposed to the temperature of the room to be air conditioned, and an oppositely disposed thermostatic element 93 having its coil exposed to the atmospheric temperature. This may be done in any suitable manner as by having the thermostatic elements separated by a flexible wall (not shown), one side of which is exposed to room temperature and the other side of which is exposed to atmospheric temperature. The thermostatic element 92 exposed to room temperature has a movable contact 94 mounted thereon, and this contact is permanently connected to one lead of the power line in which the switch is connected in series with the motor 72. On one side of the movable contact 94 is a stationary contact 96, while on the opposite side thereof is a stationary contact 97. The contacts 96 and 97 are so located with respect to the movable contact 94 as to be engageable by the contact 94 when the latter moves in opposite directions from a predetermined intermediate position. The contacts 96 and 97 have electrical connections with the opposite side of the aforesaid power line through the two-way switch 91 so that when the switch 91 is in one position the contact 96 will form one terminal of the line with which the contact 94 is associated, while in the other position of the switch 91 the contact 97 is connected in the opposite side of the line with respect to the contact 94.

The operation of the switch 84 is such that when the two-way switch 91 is in the position illustrated in Fig. 3, the contact 94 will engage the contact 96 and close the circuit through the motor 72 when the temperature within the room being air conditioned falls below a predetermined minimum, as would occur in winter when it was desired to supply heat to the room and would open said circuit some time later when a sufficient amount of heat had been supplied. With the switch 91 in the position opposite to that indicated in Fig. 3, the contact 94 would engage the contact 97 when the temperature affecting the thermostatic element 92 and within the room being air conditioned rose above a predetermined maximum, as would be the case in the summer when it might be desirable to have refrigeration applied to the room being air conditioned, and this would likewise close the circuit through the motor 72.

Since it is not desirable in summer to always maintain a room being air conditioned at a uniform temperature regardless of the atmospheric temperature, but is more preferable instead to maintain the temperature within a room being air conditioned at some predetermined relatively constant number of degrees below the atmospheric temperature, the thermostatic element 93 exposed to the atmospheric temperature as previously described, is arranged in such a way as variably to effect the operation of thermostatic element 92 whereby to resist the closing of the contact 94 upon the contact 97 as the atmospheric temperature varies. For example, the thermostatic element 93 is so constructed that it might not greatly affect the operation of the thermostatic element 92 upon a summer day when the atmospheric temperature would be 80°, for example, but under such circumstances would permit the contact 94 to close upon the contact 97 when the temperature might reach 75° in the room, for example, and to open some time later when the temperature in the room had been reduced somewhat. The next day, however, when the temperature of the atmosphere might be 90°, the thermostatic element 93 would be affected to a greater extent than on the previous day, by the temperature of the atmosphere, and would not permit the contact 94 to close upon the contact 97 at as low temperature as it did the previous day, so that the temperature within the room might be allowed to reach some high temperature, say 83°, before the contact 94 would close upon the contact 97 for closing the circuit through the motor 72 and providing refrigeration within the room.

The thermostatic elements 92 and 93 each have suitable adjusting mechanism whereby the temperature at which each will operate may be varied as conditions require.

The following is a description of the operation of the system when the latter is employed in heating a room in winter.

During such operation of this system as a heating system the valves employed in all of the various air circulating ducts of the system are located in the positions indicated by full lines in the drawing in Fig. 1. When the temperature in the room falls below a predetermined minimum, assuming the switch 91 to be in the position illustrated in Fig. 2, the thermostatic element 92 will close the contact 94 upon the contact 96, and the motor 72 will be immediately energized for driving the two blowers 41 and 42. If the humidity within the room is low enough to cause the closing of the circuit through the humidistat 86, assuming the switch 86 to be in such position as to connect the humidistat within the line, then at such time the circuit also will be closed through the electrically actuated valve 79 and water will be sprayed through the spraying device 78 within the lower part of the heat dissipating unit 13. When the blower 41 is started, a supply of relatively cool air will be drawn from the room through valve 58, duct 56 and duct 53, and this air will be discharged past the water spray 78 upon the absorber 26, the condenser 22, the rectifier 21, and the heat exchanger 29, all contained within the heat dissipating unit 13. The passage of this air over these units will cause a rapid absorption of heat by the air from all of the units, and the absorption of heat which occurs from the condenser 22 and the rectifier 21 will immediately result in a reduction in the fluid pressure within these elements and a corresponding reduction in the fluid pressure within the boiler 16. Such a reduction in the fluid pressure within the latter will, at a predetermined minimum pressure, cause the operation of the pressure actuated switch 87 to close the electrical circuit through the motor 77 and start the oil burner 38. The starting of the oil burner 38 will, of course, increase the pressure within the boiler 16, due to the vaporization of the ammonia and the water contained therein, but due to the construction of the pressure actuated switch 87, the switch will not open the circuit through the motor 77 until the pressure within the boiler has been increased to a pressure substantially above the pressure at which the pressure actuated switch 87 closed the circuit through the motor 77.

It will be observed that the products of combustion from the burner 38 pass over the heat exchanging surfaces of the boiler 16, thence in contact with the heat exchange conduit 36, and in contact with the surface of the heat exchanger 34 and out into the atmosphere through the stack 40. The amount of surface employed on these various elements can be computed in such a way as to lower the temperature of the products of combustion in the stack to a degree not greatly in excess of the temperature of the absorber 26 from which the liquid in the heat exchanger 34 is derived. The recoverable heat from the oil burner 38 is all dissipated to the air flowing upwardly within the heat dissipating device 13 through the heat exchanger 29, the rectifier 21 and the condenser 22, but in addition to this, there is also absorbed by the air within the heat dissipating unit 13 the heat dissipated by the absorber 26 which is taken from the atmosphere within the heat absorbing unit 14 as a result of the refrigeration work done by the fluid contained within the units 21, 22 and 29 after the liquid has dissipated its heat into the air within the unit 13.

As was shown in connection with the description of Fig. 2, this liquid is expanded in the evaporator 24 and there absorbs heat from the outside air, and this heat is in turn dissipated into the air within the heat dissipating unit 13 through the absorber 26. The heat dissipated by the absorber 26 therefore represents a clear gain in the heat of the room being heated over the amount of heat that would be available from the burner 13 were the heat simply employed in directly heating the room without thereafter being used for the purpose of refrigerating the outside air.

It will be apparent that the humidistat 86 can be so adjusted as to open the circuit through the electrically actuated valve 79 and to shut off the spray of water upon the units within the heat dissipating unit 13 whenever the humidity in the room being conditioned rises to the desired extent. Inasmuch as the humidistat and valve are wired in parallel with the motor 72, the heating system will continue to supply heat to the room after this event may occur.

The system will continue to operate for the purpose of heating the room until such time as the thermostatically actuated valve 84 reaches the temperature at which it is adapted to break the circuit through the motor 72 when the air will cease to be discharged from the blower 41 across the heat dissipating units within the heat dissipating unit 13, and consequently the rate of cooling of these units will be materially decreased. This will cause an immediate rising of pressure within the high pressure side of the system, which includes the boiler 16, and thereafter the pressure within the boiler will actuate the controller or pressure actuated switch 87 in such manner as to break the circuit through the motor 77. In such event the operation of the oil burner will be discontinued until such time as the temperature within the room falls low enough to again cause the closing of the electrical circuit through the motor 72 by the thermostat 84, and in which event the aforesaid cycle of heat operations will be repeated.

The conditioning system in summer may be operated for cooling a room in the following manner:

The valves in all of the ducts in the duct system heretofore described may be turned either manually or automatically into the positions indicated by the dot-and-dash lines representing the valves, as is illustrated in Fig. 1. The switch 89 of the humidistat 86 is actuated to short the humidistat 86 to provide a closed circuit through the valve 86 at all times when the circuit is closed through the thermostat 84. The switch 91 (see Fig. 2) is moved to the position opposite that illustrated in Fig. 2, whereby the circuit will be closed through the motor 72 when the contact 94 engages the contact 97.

When the temperature in the room to be cooled affecting the thermostat 84 reaches a degree high enough to overcome the variable resistance of the thermostatic element 93 (this resistance being determined by the temperature of the outside air) the contact 94 will close upon the contact 97 and thus provide an electrical circuit through the motor 72. With the valves in the air ducts in the aforesaid dot-and-dash line positions, it is apparent that the blower 41 will at once discharge upon the heat dissipating units within the heat dissipating unit 13 a blast of air drawn by the blower from the atmosphere through the air ducts 55 and 53. This blast of air will exert an immediate cooling effect upon the condenser 22, the rectifier 21, and the heat exchanger 29, which will cause a reduction in pressure within these elements and a corresponding reduction in pressure within the boiler 16. As a result of the latter reduction in pressure, the pressure controller 87 will close the electrical circuit through the motor 77 and start the oil burner 38. The application of heat by the oil burner to the boiler 16 will increase the pressure within the units 26, 22, 21 and 29 in opposition to the tendency to reduce the pressure therein caused by the flow of air thereover, and in this manner there will be generated a supply of liquid ammonia for expansion within the evaporator 24. The air from the heat dissipating unit 13, which is heated by the units 26, 22, 21 and 29, will be discharged therefrom through the lower part of the duct 67, the duct 69, and the stack 40. Inasmuch as the valve 79 remains permanently closed during the operation of the system in summer, the spray nozzle 78 will continuously discharge a spray of water upon the units within the heat dissipating unit 13 during the entire time that the motor 72 is operating.

This spray of water does not affect the humidity within the room being air conditioned, as it does in winter, but simply wets the surface of the units 26, 22, 21 and 29, and this causes a more efficient exchange of heat between the surfaces of these units and the atmosphere than would be case were these surfaces dry. The moisture is eventually picked up by the air and is discharged with the waste heat from the heat dissipating unit through the stack 41. The air discharged by the blower 42 is taken from the room being air conditioned through the opening provided by the valve 51 in its dot-and-dash line position as illustrated, the air duct 49, the air duct 46, and thereafter is discharged upwardly within the heat absorbing unit 14 upon the surface of the evaporator contained therein. The contact of such air with the evaporator cools the warm air from the room, and thereafter the cooled air is discharged from the heat absorbing unit 14 through air ducts 61, 56 and beyond valve 59 in its dot-and-dash line position and again into the room from which it was taken.

When sufficient air from the room has been cooled in this manner to reduce the temperature within the room enough to effect the breaking of the contacts 94 and 97, the motor 72 will cease to operate, and as a result thereof the operation of the system as a cooling system will be discontinued. This will occur by reason of the increase in pressure of the units within the heat dissipating unit 13 as a result of the discontinuance of the flow of air thereover and the resulting rise in pressure within the boiler 16 which will actuate the controller 87 in such a way as to stop the operation of the burner 38. When the temperature in the room has again increased to a degree where the thermostatic element 92 will close the contacts 94 and 97 against the resistance of the thermostatic element 93 affected by the outside temperature, the operation of the system as a cooling system will again be repeated as has been heretofore described.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. An air conditioning system comprising a heat dissipating unit having a liquid condenser therein, a generator for vapor being condensed by said condenser, means for delivering a blast of air upon said condenser for reducing the pressure of the fluid within said condenser, said means being adapted to circulate air to be heated between said heat dissipating unit and a room to be heated, and means responsive to the pressure of the fluid within said condenser for completely controlling the operation of said generator.

2. An air conditioning system comprising a heat dissipating unit having a liquid condenser therein, a generator for supplying vapor to be condensed to said condenser, means for discharging a blast of air upon said condenser, said means being adapted to circulate said air between said condenser and a room to be heated thereby, temperature responsive means affected by the temperature in said room for controlling the operation of said air circulating means, and means responsive to the operation of said air circulating means for controlling the operation of said generator.

3. An air conditioning system comprising a furnace and a heat dissipating unit, means for circulating air between a room to be heated and said heat dissipating unit, said means being disposed externally of said furnace, and an electrically actuated thermostat affected by the temperature of said room for controlling the operation of said circulating means, means for spraying moisture within said heat dissipating means, and means for controlling the operation of said spray means for operating said spray means when said circulating means is in operation.

4. An air conditioning system comprising a heat dissipating unit having a duct system associated therewith for circulating air between said heat dissipating unit and the interior of a room to be heated, a heat exchanging system comprising a generator, an evaporator, an absorber, and a condenser, said condenser and said absorber being located in said heat dissipating unit, and a duct system associated with said evaporator for circulating air between said evaporator and the interior of a room to be cooled, said system being external of said generator, said duct systems being adapted to be alternately connected to the same room.

5. An air conditioning system comprising absorption apparatus having a generator, a condenser, an absorber, and an evaporator, means for withdrawing the air from a space to be conditioned and reintroducing such air into such space, and means for alternately conducting said withdrawn air either to the condenser and absorber or to the evaporator prior to its reintroduction into said space.

6. A method of air conditioning which comprises heating a fluid in a combustion chamber and passing it to a heat exchange chamber, passing air through said heat exchange chamber to effect removal of heat from the fluid, passing said fluid to a second heat exchange chamber, passing air through said second heat exchange chamber to add heat to the fluid, returning said fluid to the first heat exchange chamber to remove heat therefrom, and finally returning the fluid to the combustion chamber.

7. A method of air conditioning which comprises heating a fluid in a combustion chamber and passing it to a heat exchange chamber, passing air through said heat exchange chamber to effect removal of heat from the fluid, passing said fluid to a second heat exchange chamber, passing air through said second heat exchange chamber to add heat to the fluid, returning said fluid to the first heat exchange chamber to remove heat therefrom, and passing the air from which heat has been absorbed or to which heat has been added to space to be conditioned, such alternative being dependent upon whether the space is to be cooled or heated.

8. Air conditioning apparatus comprising a combustion chamber for heating a heat exchange vehicle, a heat exchange chamber for heating air passed therethrough in heat exchange contact with said vehicle, said heat exchange chamber containing a condenser and an absorber for said heat exchange vehicle, a second heat exchange chamber containing an evaporator for said heat exchange vehicle for cooling air passed therethrough, and means for conducting air from space to be air conditioned to said air heating chamber and conducting atmospheric air to said air cooling chamber, said means being arranged to be reversed to conduct atmospheric air to the air heating chamber and the air from the conditioning space to the air cooling chamber.

9. A reversible refrigerating system either for heating or cooling, employing a vaporizable heat exchange medium which comprises, a combustion chamber containing a generator, a heat exchange chamber containing a condenser and an absorber, a cooling chamber containing an evaporator, duct work connecting both the heat exchange chamber and the cooling chamber with the atmosphere and with space to be treated, and means for switching the duct work connections to connect one or the other of said heat exchange chamber or cooling chamber with the atmosphere.

10. An air conditioning system comprising a room to be conditioned, a heat dissipating unit having a duct system associated therewith, said duct system comprising connections for intake from and exhaust to a room to be conditioned, and connections for intake from and exhaust to the atmosphere, a heat absorbing unit having a duct system associated therewith, said duct system comprising connections for intake from and exhaust to the room to be conditioned, and connections for intake from and exhaust to the atmosphere, a heat exchanging system comprising a generator, an evaporator, an absorber, and a condenser, said condenser and said absorber being located in said heat dissipating unit, said evaporator being located in said absorbing unit, and means for circulating air through said duct system for either heating or cooling the room and abstracting heat from or adding it to the atmospheric air, respectively.

11. An air conditioning system comprising a heat absorbing unit having a duct system connected thereto, said duct system comprising recirculating connections between space to be conditioned and said unit and intake and exhaust connections to the atmosphere surrounding said space, means for selectively connecting the unit to the atmosphere connections for abstracting heat from the atmosphere and to the space connections for cooling the space, means for circulating air throughout said heat absorbing unit and said duct system, temperature responsive means to be affected by the temperature in said space for starting and stopping said air circulating means, and means for varying the operation of said temperature responsive means in accordance with the variations in temperature outside said space.

12. An air conditioning system comprising a heat absorbing unit having a duct system associated therewith, said duct system comprising recirculating connections to a room to be heated and intake and exhaust connections to the atmosphere outside of said room, means adjustable at the will of the operator for connecting the duct system associated with said heat absorbing unit to the atmosphere connections for abstracting heat from the atmosphere and supplying it to the room connections for heating the room or with said recirculating connections, means causing a positive circulation of air throughout said duct system and said heat absorbing unit, a thermostat affected by the temperature of said room for causing the operation of said air circulating means, said thermostat being adapted to operate at a predetermined temperature, and means affecting said thermostat for varying said predetermined temperature in proportion to variations in temperature outside said room.

13. A method of conditioning the air within a space which comprises establishing an air circuit by withdrawing air from the space and varying the temperature thereof prior to returning the air to the space, heating a vaporizable heat exchange medium and passing it sequentially in a closed circuit through a heat dissipating heat exchange chamber, a heat absorbing heat exchange chamber, back through the heat dissipating chamber for absorbing the heat exchange medium and then to its initial heating point, and controlling the path of the air circuit to divert it into either of said heat exchange chambers depending upon conditions obtaining in the space being treated.

14. An air conditioning system employing a vaporizable heat transfer vehicle and a liquid absorbing agent comprising a generator for vaporizing and driving off the vehicle from the liquid, a heat dissipating chamber in which the vehicle yields up heat taken on while it was being vaporized and heat of absorption to a stream of air, a heat absorbing chamber in which the vehicle takes on heat from a second stream of air, and means for selectively connecting either of said streams of air to the space which is to be conditioned for either heating or cooling the same.

EARL F. HUBACKER.